United States Patent [19]

Kumazawa

[11] 4,165,038

[45] Aug. 21, 1979

[54] DEVICE FOR ATOMIZING AND DISPERSING A FLUID

[75] Inventor: Toshiharu Kumazawa, Fujisawa, Japan

[73] Assignee: Mitsubishi Precision Co., Ltd., Kamakura, Japan

[21] Appl. No.: 856,128

[22] Filed: Nov. 30, 1977

[30] Foreign Application Priority Data

Dec. 3, 1976 [JP] Japan ................... 51-144616

[51] Int. Cl.² ............................ B05B 1/26; B05B 1/34
[52] U.S. Cl. .................... 239/405; 239/452; 239/470; 239/516; 239/524
[58] Field of Search ............... 239/403, 405, 406, 453, 239/459, 452, 467–470, 472, 475, 505, 507, 512, 515, 516, 524

[56] References Cited

U.S. PATENT DOCUMENTS

| | | | |
|---|---|---|---|
| 1,381,095 | 6/1921 | Starr | 239/468 X |
| 1,575,895 | 3/1926 | Baker | 239/515 |
| 2,247,897 | 7/1941 | Wahlin | 239/468 |
| 2,346,333 | 4/1944 | Schaumann | 239/406 |
| 2,737,414 | 3/1956 | Wenzel | 239/470 X |
| 3,958,760 | 5/1976 | Rosenberg | 239/524 X |

FOREIGN PATENT DOCUMENTS 1106338  12/1955  France .................. 239/469

Primary Examiner—Johnny D. Cherry
Attorney, Agent, or Firm—Merchant, Gould, Smith, Edell, Welter & Schmidt

[57] ABSTRACT

Disclosed is a device for atomizing and dispersing a fluid in the form of a high speed dispersion filmy stream toward the environment surrounding the device. The device has a hollow cylindrical fluid barrel element in which a fluid, or fluids, under pressure is ejected so as to turn around an axis of the fluid barrel element, and a fluid dispersing round member defining a small dispersing opening between a conically convexed dispersing surface of the dispersing round member and a complementary end face of the fluid barrel element. The fluid dispersing round member is held by a flexible support structure so that the fluid dispersing round member is hydrodynamically drawn toward the fluid barrel.

16 Claims, 8 Drawing Figures

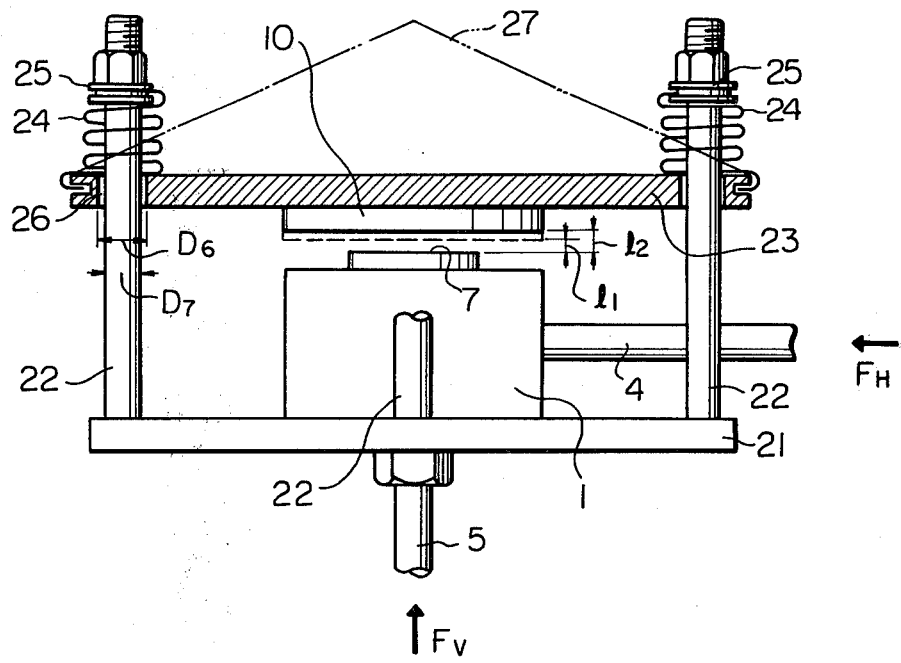
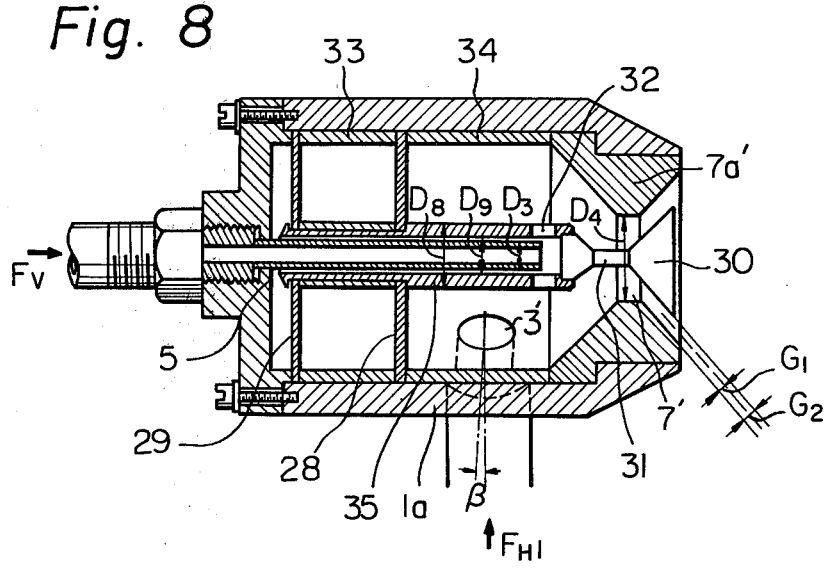

DEVICE FOR ATOMIZING AND DISPERSING A FLUID

FIELD OF THE INVENTION

The present invention relates to a device for atomizing a fluid or fluids selected from gases, liquids and powders and dispersing the atomized fluid or fluids into the environment surrounding the device in the form of a radially spreading fluid film. Also, the device of the present invention is adapted for use in mixing fluids and spouting the mixed fluid in the form of a parachute-like dispersion stream consisting of fine particles of the mixed fluid toward the environment surrounding the device. In the device of the present invention, a hollow barrel member is arranged so that at least one fluid under pressure flows into the barrel member so as to cause a high speed turning motion of the fluid within the barrel member. The high speed turning motion of the fluid creates a hydrodynamic action causing atomizing of a further fluid separately supplied to the hollow barrel member and mixing the atomized fluid with the turning fluid. The mixed fluid is dispersed into the environment surrounding the device at a high speed in the form of radially spreading fluid film suspending therein fine particles of the mixed fluids. The mixed fluid is further subjected to mixing action during the high speed dispersion from the device of the present invention.

BACKGROUND OF THE INVENTION

In some of the conventional fluid spraying devices of the type having a spraying nozzle, a high speed turning motion of a fluid or fluids caused by the device per se is utilized for forming a dispersion stream of the fluid or fluids. However, in the above-mentioned type of the conventional spraying device, a defect is encountered in that when the spraying nozzle of the device is located in a gaseous environment so that more than one liquid is concurrently dispersed from the spraying nozzle into the gaseous environment, complete atomizing and mixing of the liquids is not achieved. On the other hand, when the spraying nozzle of the conventional spraying device is located in a liquid so that a gaseous fluid or fluids are dispersed from the nozzle into the surrounding liquid, a defect is encountered in that complete separation of the gaseous fluid into fine bubbles is not attained.

The above-mentioned defects encountered with the conventional spraying device are caused because, in the structure of the conventional spraying device, effective use of the hydrodynamic low pressure zone cannot be made. That is to say, although hydrodynamic low pressure zones are created in a region in which the high speed turning motion of fluids is caused, as well as in the other region in which the fluids are dispersed from the spraying device, any fluid surrounding the device is easily dragged into the created hydrodynamic low pressure zones. Therefore, the hydrodynamic low pressure zones are not able to contribute to the high speed dispersion of the fluids.

SUMMARY OF THE INVENTION

An object of the present invention is to provide a fluid atomizing and dispersing device whereby the above-mentioned defects encountered with the conventional spraying device of the type having a spraying nozzle are obviated.

Another object of the present invention is to provide a fluid atomizing and dispersing device which can be adopted for achieving intimate mixing of at least two fluids and dispersing the mixed fluids into a fluid surrounding the device.

In accordance with the present invention, the present invention relates to an improvement in a device for atomizing at least one fluid, said device including a cylindrical fluid barrel having a tangential fluid inlet port, a converging zone at the upper end of said barrel, and a conical fluid outlet with a fluid dispersing round member, wherein the improvement comprises:

a flexible support structure for holding said fluid dispersing round member so that said fluid dispersing round member is hydrodynamically moved toward said conical fluid outlet by a low pressure created by a high speed turning motion of the fluid in said cylindrical barrel, whereby the fluid is dispersed in the form of a high-speed dispersion filmy stream toward the environment surrounding the device.

Further objects and advantages of the present invention will become apparent from the ensuing description of preferred embodiments with reference to the accompanying drawings wherein:

FIG. 7 is a side view, in partial cross section, of the device according to a fourth embodiment of the present invention, and;

FIG. 8 is a longitudinal cross-sectional view of the device according to a fifth embodiment of the present invention.

DESCRIPTION OF PREFERRED EMBODIMENTS

Figure 1:
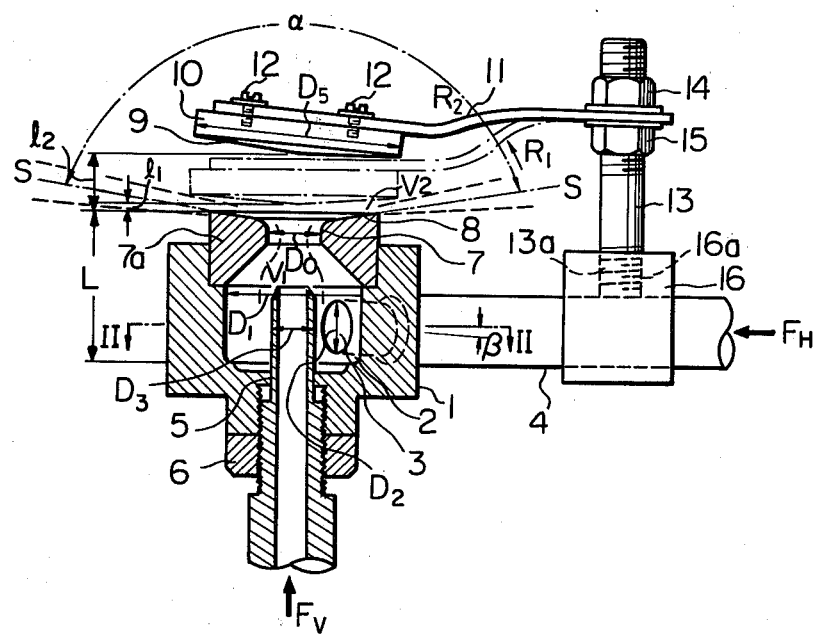
FIG. 1 is a side view, in partial cross section, of the device according to a first embodiment of the present invention.
Figure 2:
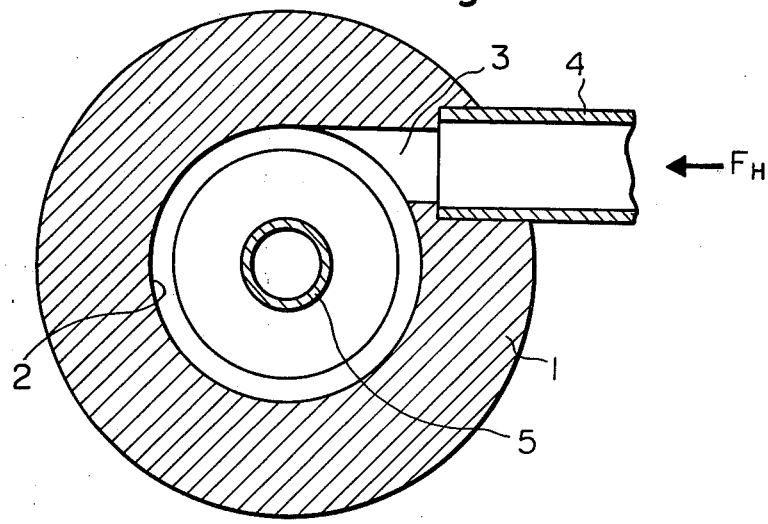
FIG. 2 is a cross-sectional view taken along the line II—II of FIG. 1.
Figure 3:
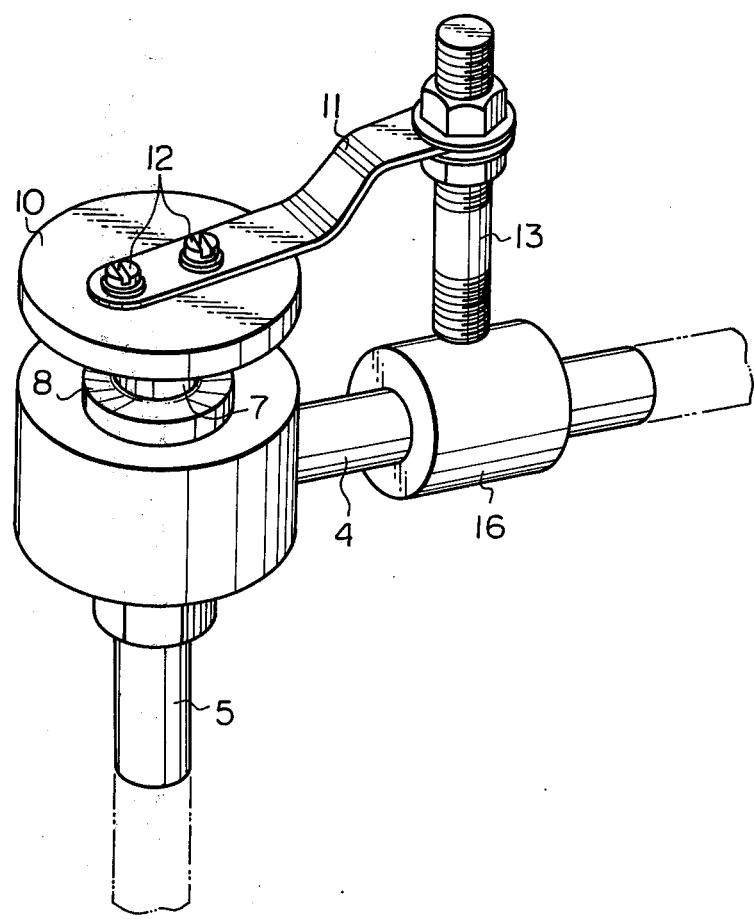
FIG. 3 is a perspective view of the device shown in FIGS. 1 and 2.

Referring now to FIGS. 1 through 3, illustrating a first embodiment of the present invention, a fluid barrel 1 shaped as a hollow cylindrical member of a length L has an inner axial bore of diameter $D_1$. The inner wall 2 defining the axial bore of the fluid barrel 1 is formed with an inlet port 3 through which a pressurized fluid $F_H$ flows into the fluid barrel 1. The pressurized fluid $F_H$ is supplied through a fluid supply pipe 4 connected to the inlet port 3. The pressure applied to the fluid $F_H$ is adjusted so that a strong ejection of the pressurized fluid $F_H$ from the inlet port 3 into the axial bore of the fluid barrel 1 is formed. As is best shown in FIG. 2, the inlet port 3 is so located that the pressurized fluid $F_H$ ejects into the fluid barrel 1 in the tangential direction with respect to the center of the axial bore of the fluid barrel 1. Therefore, the ejecting fluid $F_H$ generates a fluid stream turning along the inner wall 2 at a high speed. The high speed turning stream of the fluid $F_H$ creates a hydrodynamic low pressure zone $V_1$ in the central portion of the axial bore of the fluid barrel 1.

A tubular fluid spouting member 5, which projects into the axial bore of the fluid barrel 1, is threadedly engaged with a lower part of the fluid barrel 1 in such a manner that it plugs and seals the lower part of the fluid barrel 1. The fluid spouting member 5 is disposed so as to be coaxial with the fluid barrel 1. A portion of the fluid spouting member 5, which projects into the axial bore of the fluid barrel 1, has an outer diameter $D_3$ as indicated in FIG. 1. The axial position of the fluid spouting member 5 with respect to the fluid barrel 1 can be adjusted by means of a nut 6 threadedly engaged with the member 5. The nut 6 is also used for providing a tight lock between the fluid spouting member 5 and the fluid barrel 1. The fluid spouting member 5 is supplied with a fluid $F_V$. Therefore, when the hydrodynamic low pressure zone $V_1$ is created in the bore of the fluid barrel 1, the low pressure prevailing in the hydrodynamic low pressure zone $V_1$ causes the fluid $F_V$ in the fluid spouting member 5 to hydrodynamically spout into the zone $V_1$. As soon as the fluid $F_V$ spouts from the fluid spouting member 5, the fluid $F_V$ is immediately atomized and mixed with the turning stream of the pressurized fluid $F_H$. That is to say, the fluid $F_V$ is formed into fine fluid particles and contained in the fluid $F_H$.

At an upper part of the fluid barrel 1, a fluid outlet member 7a, defining an upwardly converging fluid accelerating zone, and a fluid outlet 7, having a diameter $D_o$, are disposed. Thus, when the fluids $F_H$ and $F_V$ are mixed with one another, the mixture of the two fluids is subsequently jetted from the fluid outlet 7 at a high speed after the stream of the mixture of the fluids has been accelerated by the converging fluid accelerating zone. Upon being jetted from the fluid outlet 7, the stream of the mixture of the fluids $F_H$ and $F_V$ still involves a turning motion. An outermost end face of the fluid outlet 7 is shaped as a conically concave annular face 8 as shown in FIG. 1. Therefore, the high speed stream of the mixture of the fluids is dispersed toward the outside of the fluid barrel 1 while being guided by the conically concaved end face 8 so as to form a filmy dispersing stream S of the mixture of the fluids $F_H$ and $F_V$. A dispersing angle of the dispersing stream of the mixture of the fluids is determined by the conically concaved end surface 8 of the fluid outlet 7.

A disc member 10 capable of widely dispersing the mixture of the fluids is disposed adjacently outside the fluid outlet 7. The disc member 10 is provided with a fluid dispersing surface 9 which is conically convexed toward the fluid outlet 7. The conically convexed surface 9 is shaped to be substantially complementary with the conically concaved end face 8. Therefore, the vertical angle of the surface 9 is substantially equal to the above-mentioned dispersing angle $\alpha$. The disc member 10 is provided with a base portion having a diameter $D_5$ and is fixed to a flexible support plate 11 by means of an appropriate fixing means such as screws 12. It should here be understood that, in the case where the dispersing angle $\alpha$ should be 180 degrees, the conically concaved end face 8 together with the conically convexed surface 9 are accordingly shaped as a flat surface, respectively.

The flexible support plate 11 is fixed to a rigid support rod 13 by means of nuts 14 and 15 threadedly engaged with the rigid support rod 13. The flexible support plate 11 is formed with curved portions $R_1$ and $R_2$ so that no part of the dispersing stream S is blocked by the flexible support plate 11.

As previously stated, the turning stream of the mixed fluids $F_V$ and $F_H$ which are jetted from the fluid outlet 7 is dispersed at a high speed with the help of the conically convexed surface 9 of the disc member 10 along the conically concaved end face 8 toward the outside of the fluid barrel 1. As a result, a hydrodynamic low pressure zone $V_2$ is generated in an area extending along the inside of the dispersing stream S, as shown in FIG. 1. Therefore, both hydrodynamic low pressure zones $V_1$ and $V_2$ cooperatively exhibit a hydrodynamic action to draw the disc member 10 toward the fluid outlet 7 while flexing the flexible support plate 11. The position of the disc member 10 indicated by solid lines in FIG. 1 shows that the disc member 10 is in an initial non-operating position, whereas the position of the disc member 10 indicated by dotted lines in FIG. 1 shows that the disc member 10 has approached the fluid outlet 7 due to the above-mentioned hydrodynamic drawing action exhibited by the hydrodynamic low pressure zones $V_1$ and $V_2$ during the operation of the device. As the disc member 10 approaches the fluid outlet 7, the distance between the conically convexed surface 9 of the disc member 10 and the conically concaved end face 8 becomes automatically small. Therefore, the speed of the dispersing stream S of the mixture of the fluids $F_H$ and $F_V$ is maintained high. Accordingly, the hydrodynamic action exhibited by both hydrodynamic low pressure zones $V_1$ and $V_2$ is maintained at high effective level. Consequently, the mixing of the fluids $F_H$ and $F_V$ and the atomizing and dispersing of the mixed fluids $F_H$ and $F_V$ are continuously and effectively achieved during the operation of the device.

It should be noted that the flexible support plate 11 is comprised of an elastic material and is shaped so that the disc member 10 is easily moved from the initial non-operating position toward the fluid outlet 7 against the elastic force of the support plate 11, while the hydrodynamic low pressure zones $V_1$ and $V_2$ exist. The distance $l_2$ between the initial position of the disc member 10 and the uppermost edge of the fluid barrel 1 is adjusted so that, while the atomizing and dispersing operations are performed, the disc member 10 is eventually moved to a position where the conically convexed surface 9 of the disc member 10 is substantially in parallel with the conically concaved end face 8 of the fluid barrel 1. The distance $l_1$ shown in FIG. 1 shows this parallel state of the disc member 10. However, it will be easily understood that the distance $l_1$ changes in response to a change in the amount of the mixture of the fluids $F_H$ and $F_V$ jetted from the fluid outlet 7. Therefore, in response to a change in the amount of the mixture of the fluids $F_H$ and $F_V$ jetted from the fluid outlet 7, the adjustment of the initial distance $l_2$ of the disc member 10 is performed. The adjustment of the above-mentioned distance $l_2$ can be achieved by rotating the nuts 14 and 15 so as to upwardly or downwardly move the flexible support plate 11.

The support rod 13 for mounting thereon the flexible support plate 11 is rigidly attached to the fluid supply pipe 4 by means of a block 16. The block 16 is formed with a threaded bore 16a in which a theaded portion 13a of the support rod 13 is screwed until the bottom end of the support rod 13 abuts against the outer surface of the fluid supply pipe 4.

With the above-mentioned disposition of the fluid barrel 1 and the fluid dispersing disc member 10, if the conically convexed surface 9 of the disc member 10 is subjected to abrasion by the jetting flow of the high speed mixture of the fluids from the fluid outlet 7 during the continuous usage of the disc member 10, the distance between the disc member 10 and the end face 8 of the fluid barrel 1 is automatically adjusted. This is because the position of the disc member 10 is adjustably moved by the hydrodynamic drawing action of the hydrodynamic low pressure zones $V_1$ and $V_2$.

In the embodiment shown in FIG. 1, the central axis of the inlet port 3 is upwardly inclined by an angle $\beta$ (an appropriate number of degrees) with respect to the horizontal plane perpendicular to the central axis of the fluid barrel 1. Thus, when the pressurized fluid $F_H$ is ejected from the inlet port 3 into the axial bore of the fluid barrel 1, the fluid $F_H$ is provided with an inherent property of flowing in the direction toward the fluid outlet 7. In other words, the turning stream of the pressurized fluid $F_H$ spirally rises in the fluid barrel 1 toward the fluid outlet 7.

Now, if the amount of the fluid $F_V$ spouted from the tubular fluid spouting member 5 is gradually increased by, for example, applying a pressure to the fluid $F_V$ in the pipe 5 during the operation of the device, the spouted fluid $F_V$ counteracts the ejecting stream of the pressurized fluid $F_H$ which turns along the inner wall 2 of the fluid barrel 1. As a result, the turing speed of the fluid $F_H$ is decreased. Accordingly, the hydrodynamic action exhibited by the hydrodynamic low pressure zone $V_1$ is weakened and becomes insufficient for drawing the disc member 10 toward the fluid outlet 7. As a result, the disc member 10 is moved away from the fluid outlet 7 due to the elasticity of the plate 11. Consequently, the distance between the conically convexed surface 9 of the disc member 10 and the end face 8 of the fluid outlet member 7a is automatically, hydrodynamically widened, and thus, the speed of the dispersing stream S of the mixture of the fluids $F_H$ and $F_V$ must be lowered. Therefore, it is preferred that some means be additionally arranged for physically preventing the disc member 10 from being moved away from the fluid outlet 7, so that the speed of the dispersing stream S of the mixture of the fluids can always be maintained at such an appropriate high level that effective atomizing of the fluid $F_V$, as well as effective mixing and dispersing of the fluids $F_V$ and $F_H$, are continued.

Figure 4:
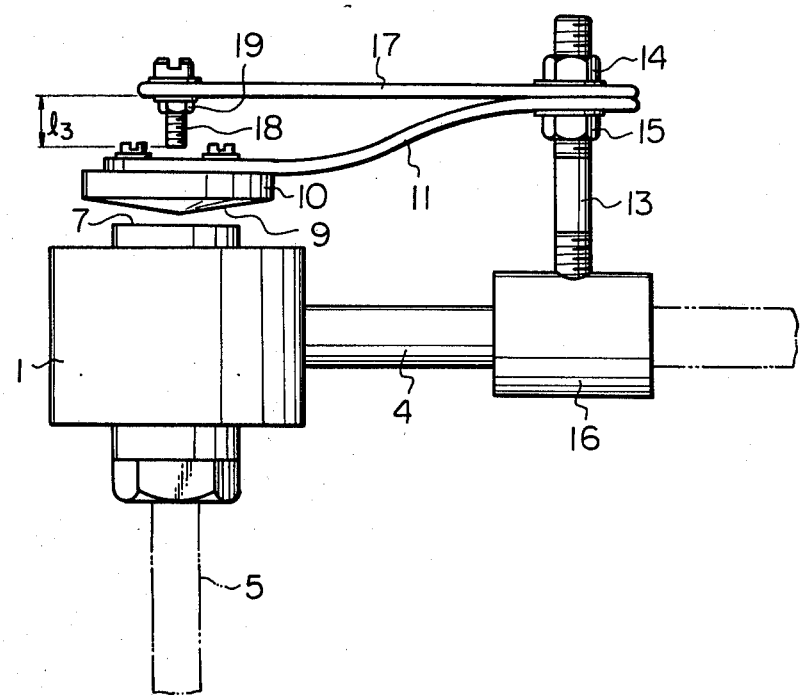
FIG. 4 is a side view of the device according to a second embodiment of the present invention.

FIG. 4 illustrates an embodiment in which an additional flexible support plate 17 is disposed above the support plate 11 as the above-mentioned physical preventing means. The support plate 17 can operate so as to limit the upward movement of the disc member 10. The additional support plate 17 has a screw 18 mounted on a front end thereof so that the screw 18 projects toward the support plate 11. The screw 18 is so positioned that the axis of the screw 18 is aligned with the center of the fluid barrel 1. The projecting length $l_3$ of the screw 18 may be adjusted by rotating the screw 18. After the adjustment, the screw 18 is locked to the support plate 17 by means of a nut 19. When the disc member 10 is upwardly moved because the hydrodynamic drawing action is weakened and when the distance between the disc member 10 and the conically concaved end face 8 of the fluid outlet 7 is widened beyond a given value, the support plate 11 abuts against the projecting end of the screw 18. After the abutment of the screw 18 and the support plate 11, the upward movement of the disc member 10 urges the screw 18 to move in the upward direction. However, since the upward movement of the screw 18 must be caused against the elastic force exhibited by the support plate 17 during flexing of the plate 17, the upward movement of both disc member 10 and screw 18 is eventually stopped by the support plate 17.

This is because an increase in the flexing of the support plate 17 causes an increase in the elastic force exhibited by the plate 17. Thus, the distance between the disc member 10 and the fluid barrel 1 is prevented from being further widened. Consequently, effective mixing of the fluids, as well as effective atomizing and dispersing of the mixed fluids, can be achieved. It should be understood that, the stronger the elasticity of the flexible support plate 17, the smaller the widening of the distance between the disc member 10 and the conically concaved end face 8 becomes.

Figure 5:
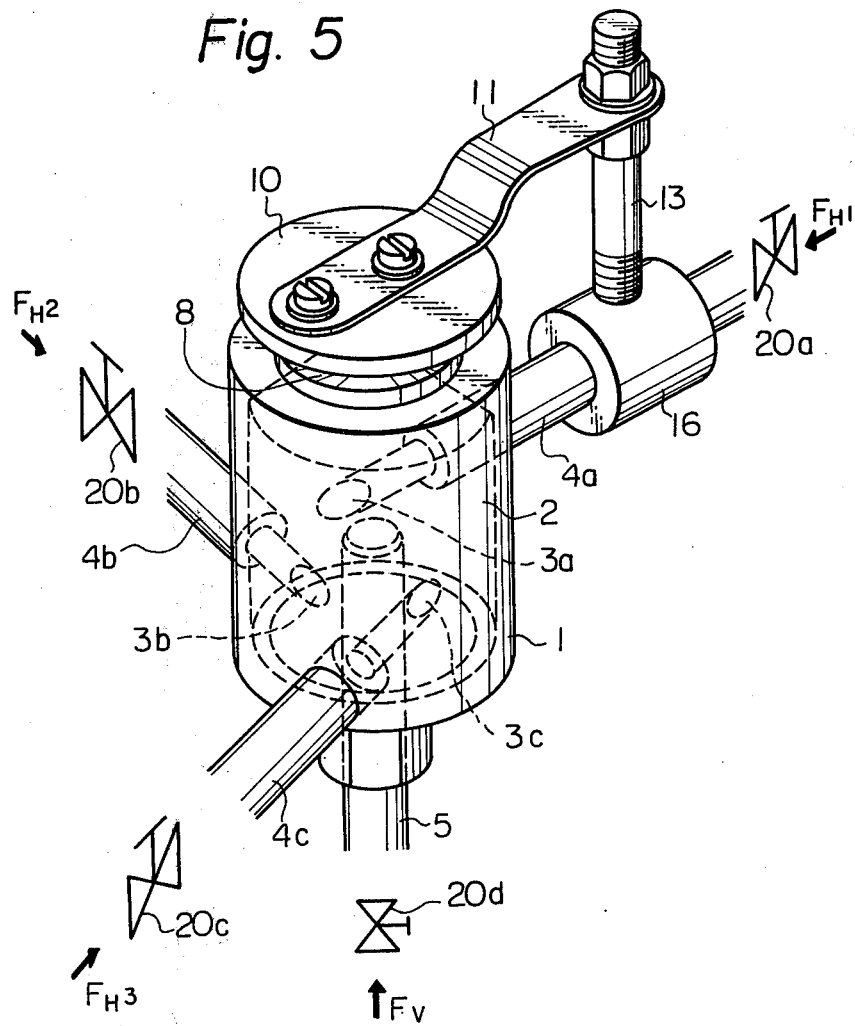
FIG. 5 is a perspective view of the device according to a third embodiment of the present invention.
Figure 6:
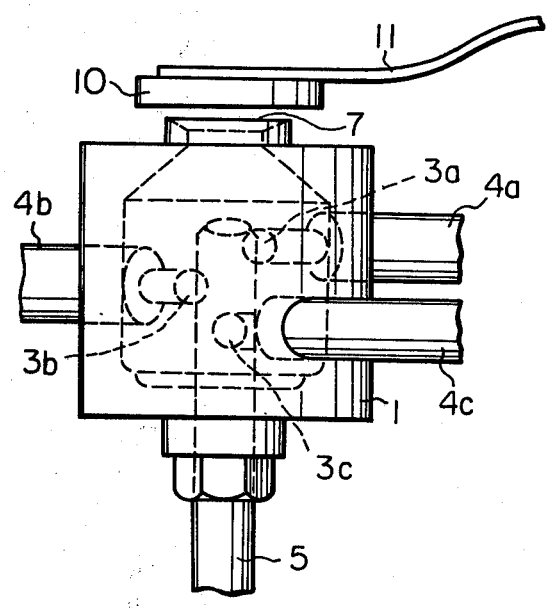
FIG. 6 is a side view of the device shown in FIG. 5.

FIGS. 5 and 6 illustrate a further embodiment in which the fluid barrel 1 is formed with a plurality of inlet ports 3 (an example of three inlet ports identified by 3a through 3c is illustrated). Preferably, the three inlet ports 3a through 3c are disposed so that the axial positions of the inlet ports are different from one another. The three inlet ports 3a, 3b and 3c are supplied with pressurized fluids $F_{H1}$, $F_{H2}$ and $F_{H3}$, respectively, by way of three corresponding fluid supply pipes 4a, 4b and 4c. The above-mentioned difference between three axial positions of the inlet ports 3a through 3c allows the individual pressurized fluids $F_{H1}$ through $F_{H3}$ to eject into the bore of the fluid barrel 1 without being subjected to any appreciable flow resistance.

In the embodiment of FIGS. 5 and 6, four different fluids $F_{H1}$ through $R_{H3}$ and $F_V$ flow into the bore of the fluid barrel 1. The flow amount of the four different fluids is regulated, respectively, by fluid control valves 20a, 20b, 20c and 20d. Therefore, the flow amount ratio among the four fluids $F_{H1}$ through $F_{H3}$ and $F_V$ can easily be adjusted as required. In the fluid barrel 1, the four fluids are subjected to atomizing and mixing actions caused by the turning motion of the three fluids $F_{H1}$ through $F_{H3}$, and the mixed fluids spirally flow toward the fluid outlet 7 while being accelerated in the converging zone of the fluid barrel 1. Subsequently, the mixed fluids are dispersed from the fluid outlet 7 while being guided by the outermost end face of the fluid outlet 7.

It should be understood that the device of FIGS. 1 through 3, FIG. 4 or FIGS. 5 and 6 may be arranged in any position different form the vertical position illustrated in the figures when the device is placed into practical use. In this connection, if the embodiment of FIG. 4 is practically used in a position where the device is disposed upside down so that the fluid outlet 7 is downwardly directed, the screw 18 mounted on the support plate 17 is effectively used for preventing the disc member 10 from being downwardly moved due to the force of gravity, even if the elasticity of the flexible support plate 11 of the disc member 10 is weak. Further, if preferable, a plurality of the devices may be concurrently arranged in parallel with one another or in series.

FIG. 7 shows another embodiment of the fluid atomizing and dispersing device of the present invention. This embodiment is different from the previous embodiments in that the flexible support plate 11 for holding the disc member 10 is replaced with a support disc 23. The support disc 23 is suspended by a plurality of springs 24 which are connected to vertical posts 22, respectively. The vertical posts 22 (three posts in the case of the embodiment of FIG. 7) are fixedly mounted on a base plate 21 attached to the fluid barrel 1. To the support disc 23, the fluid dispersing disc member 10 is attached so as to confront the fluid barrel 1. The initial position of the disc member 10 with respect to the fluid barrel 1 is indicated by a solid line in FIG. 7. In the initial position, the distance between the disc member 10 and the top edge of the fluid barrel 1 is shown as $l_2$. This distance $l_2$ is adjusted by upwardly or downwardly moving screw mechanisms 25 for attaching the springs 24 to the vertical posts 22. The support disc 23 is formed with three bores 26 through which the vertical posts 22 extend from the base plate 21. The diameter $D_6$ of each of the three bores 26 is selected to be appreciably larger than the diameter $D_7$ of the vertical posts 22, so that free vertical movement of the support disc 23 is permitted.

In the embodiment of FIG. 7, when the mixture of the fluids $F_H$ and $F_V$ is dispersed from the fluid outlet 7 of the fluid barrel 1, the previously mentioned hydrodynamic drawing action acts on the disc member 10. Therefore, the disc member 10 is drawn and moved toward the fluid outlet 7 until the position indicated by dotted lines in FIG. 7. That is, the distance between the disc member 10 and the fluid barrel 1 is narrowed to $l_1$ from $l_2$. Accordingly, the dispersing stream of the mixture of the fluids $F_H$ and $F_V$ is formed as a high speed laminar stream. As a result, the mixing of the fluids $F_H$ and $F_V$ and the atomizing and dispersing of the mixture of the fluids $F_H$ and $F_V$ are effectively achieved. Further, in order to prevent dusty material from settling on the support disc 23, an appropriate roof 27 may be disposed above the support disc 23. Otherwise, an appropriate number of through-bores may be formed in the support disc 23. The fluid barrel 1 may, of course, be provided with a plurality of inlet ports for permitting the flowing of a plurality of fluids into the barrel 1, as is described with reference to the embodiment of FIGS. 5 and 6. Further, it should be understood that, if preferable, the device of the embodiment of FIG. 7 may also be used in a position in which the device is disposed upside down. In addition, in the case of the embodiment of FIG. 7, the movement of the disc member 10 with respect to the fluid barrel 1 is performed so that the disc member 10 is always kept parallel with the top edge of the fluid outlet 7 of the fluid barrel 1. Therefore, there is the advantage that the dispersion of the mixture of the fluids $F_H$ and $F_V$ is quite uniform in every direction.

With the embodiment of FIG. 7, in some cases, the springs 24 may be eliminated, so that the support disc 23 together with the disc member 10 freely rest on the fluid barrel 1. In this case, the support disc 23 and the disc member 10 are lifted by the force of the mixture of the fluids $F_H$ and $F_V$ which is dispersed from the fluid outlet 7 of the fluid barrel 1. At this stage, the screw mechanisms 25 are used to limit the lifting of the support disc 23 and the disc member 10 within a predetermined range. The above-mentioned spring eliminated structure of the device is very effective when the device or devices are installed and operated in a liquid containing sludge therein, since, when the device is not in operation, the disc member 10 resting on the barrel 1 closes the liquid outlet 7 so that no sludge in the liquid flows into the fluid barrel. On the other hand, if preferable, any appropriate stop members may be mounted on the vertical posts 22 so as to prevent the support disc 23 and the disc member from freely resting on the top of the fluid barrel 1. In that case, there is provided a small initial gap (the initial distance $l_2$) between the disc member 10 and the top edge of the fluid outlet 7 of the fluid barrel 1 when the device is not in operation. Therefore, as soon as the operation of the device is started, atomizing and dispersing of the mixture of the fluids $F_H$ and $F_V$ will be immediately started.

It should be appreciated that each of the above-described embodiments of the device of the present invention can be particularly effective for dispersing a gas or gases into a liquid or liquids, so that the gas or gases are intimately mixed with the liquid or liquids. As an example, an experiment was conducted by placing a device according to the present invention in a sodium sulfite liquid. In the experiment, the sodium sulfite liquid was circulated through the device by way of an appropriate pressurizing means as the fluid $F_H$, whereas air was fed to the device as the fluid $F_V$. As a result, the air was divided into fine bubbles and mixed with the turning stream of the sodium sulfite liquid in the fluid barrel of the device. Then, the air mixed sodium sulfite liquid was disposed from the liquid outlet of the fluid barrel through a hydrodynamically defined gap between the outermost end face of the fluid barrel and the dispersing disc member. Consequently, the aeration of the sodium sulfite liquid was achieved at a speed two times higher than the conventional aeration method employing an aeration plate or an aeration pipe. It was further ascertained that the above-mentioned aeration speed achieved by the device of the present invention was quicker by 30 percent than in the case of a fluid turning motion type dispersing device having no fluid dispersing disc member.

Referring now to FIG. 8, which illustrates a further embodiment of the device of the present invention, a hollow cylinder 35 is mounted coaxially with respect to a tubular fluid spouting member 5. The hollow cylinder 35 has a diameter $D_8$ and is axially, movably supported by round disc springs 28 and 29. At the outermost end of the hollow cylinder 35, a fluid dispersing member 30, having an inwardly converging conical shape, is disposed. The hollow cylinder 35 and the conical fluid dispersing member 30 are interconnected by a support rod 31. The hollow cylinder 35 is formed, at the periphery of the outermost end portion, with a plurality of fluid spouting holes 32. A fluid outlet member 7a' defining therein an outwardly converging accelerating zone and having a fluid outlet 7' is disposed at an end of a fluid barrel 1a, similar to the fluid barrel 1 of the previously described embodiments. The round disc springs 28 and 29 are axially spaced apart from one another by means of a cylindrical member 33 having an appopriate axial length. A spacing ring 34 is disposed in the fluid barrel 1a so that a predetermined initial gap $G_2$ is provided between the fluid outlet member 7a' and the fluid dispersing member 30. The spacing ring 34 is formed with a round through-hole which is aligned with a fluid inlet port 3' formed in the fluid barrel 1a. Therefore, a fluid $F_{H1}$ flows into the fluid barrel 1a in a similar way to the fluid barrel 1 of the device of FIGS. 1 through 3. When the fluid $F_{H1}$ flows into the fluid barrel 1a under a predetermined pressure, a turning stream of the fluid $F_{H1}$ is formed in the fluid barrel 1a, and then, the turning stream of the fluid $F_{H1}$ is spouted from the fluid outlet 7' after being accelerated by the converging accelerating zone of the fluid outlet member 7a'. Therefore, a first hydrodynamic pressure zone is created in the center of the turning stream of the fluid $F_{H1}$, and concurrently, a second hydrodynamic low pressure zone is created around the fluid dispersing member 30. Accordingly, a fluid $F_V$ supplied through the fluid spouting member 5 is dragged into the turning stream of the fluid $F_{H1}$ through the fluid spouting holes 32, by the hydrodynamic action exhibited by the first hydrodynamic low pressure zone, and is mixed with the fluid $F_{H1}$. Further, the fluid dispersing member 30 is axially inwardly moved toward the fluid outlet 7' by the hydrodynamic drawing action exhibited by the first and second hydrodynamic low pressure zones. When the fluid dispersing member 30 is axially moved, an opening defined between the fluid dispersing member 30 and the fluid outlet 7' of the fluid barrel is 1a is decreased from the distance $G_2$ to a smaller distance $G_1$. Thus, the mixture of the fluids $F_{H1}$ and $F_V$ can be dispersed at a high speed through the opening between the member 30 and the fluid outlet 7'. Therefore, further mixing of the fluids $F_V$ and $F_{H1}$ is promoted during the high speed dispersion of the mixture of the fluid $F_{H1}$ and $F_V$. It should be understood that as required, a plurality of inlet ports 3' may be disposed in the wall of the fluid barrel 1a.

In FIG. 8 the axis of the inlet port 3' is inclined by an angle $\beta$ for the same reason as described with reference to the first embodiment shown in FIGS. 1 through 3. Preferably, the round disc springs 28 and 29 are formed with a slit or slits, respectively, so as to improve elasticity of both springs. The outer diameter $D_3$ of the fluid spouting member 5 and the inner diameter $D_9$ of the hollow cylinder 35 are so chosen that the hollow cylinder 35 is able to freely move in the axial direction with respect to the member 5. Further, preferably, a small hole or holes are formed in the periphery of the hollow cylinder 35 adjacent to the round disc member 28, so that any part of the fluid $F_V$, which flows into an annular gap between the hollow cylinder 35 and the tubular fluid spouting member 5, is able to flow out of the annular gap into the inside of the fluid barrel 1a.

The device of the embodiment of the present invention shown in FIG. 8 may be disposed in any position other than the horizontal position shown in FIG. 8. It should be appreciated that the device shown in FIG. 8 is most advantageously used when the device is placed in a gaseous atmosphere and is adopted for atomizing and mixing more than two different liquids, and for dispersing the mixed liquids into the gas. For example, an experiment was conducted in which the device of the type shown in FIG. 8 and having two axially spaced inlet ports 3' was employed as a fuel supplier of a fuel burner. In the experiment, pressurized air was supplied into the device through the inlet port 3' most distant from the fluid outlet 7' as a first fluid $F_{H1}$, and also, pressurized water was supplied into the device through the other inlet port 3' close to the fluid outlet 7' as a second fluid $F_{H2}$. Further, as a third fluid $F_V$, kerosene was spouted from the fluid spouting member 5 into the turning stream of the air and water in the fluid barrel 1a. Upon being spouted, the kerosene was atomized, and the atomized kerosene particles were mixed with the air and the water. Subsequently, the mixture of the air, water and kerosene was disposed toward the outside through the small opening between the fluid outlet 7' and the fluid dispersing member 30, so that further mixing of the air, water and kerosene was promoted, and was burned on the outside of the device. As a result, the burned gas product including harmful nitrogen oxides ($NO_x$) of less than 40 PPM, under such a condition that the volume ratio of the water (water/kerosene$\times$100) was 28 percent and that the volume ratio of the oxygen was 4%. This result indicated that the containing ratio of nitrogen oxides in the gases product was one half that of the case where no water is included in the mixture to be burned. Therefore, it was ascertained that the device of the present invention is very effective for intimately mixing plural fluids and for dispersing the mixed fluids.

As will be understood from the foregoing description, the device of the present invention has an excellent function of atomizing and mixing fluids, and dispersing the mixture of the fluid into a fluid surrounding the device in the form of a wide filmy dispersion stream. Therefore, the device of the present invention has the following various applications.

(1) If the device of the present invention is located in a liquid, and if the liquid is mixed and atomized with another liquid while the liquid is recycled to the device, and the atomized liquid mixture is dispersed at a high speed into the liquid, an apparatus for mixing at least two liquids effectively can be constructed by using the device of the present invention.

(2) If the device of the present invention is arranged so that the fluid outlet is directed to a liquid and at least one gas is dispersed into the liquid as fine bubbles from the device, the device of the present invention can be practically utilized as a gas-liquid contact means, aeration means, or separating means for causing suspended substances or oil drops in the liquid to rise and separating them from the liquid.

(3) If the fluid outlet of the device of the present invention is directed to a gas and the device is arranged so that at least one powder is dispersed from the fluid outlet, it is possible to atomize the powder, into uniform powder particles and mix at least two powders homogeneously.

(4) When the device of the present invention is used as a means for atomizing a liquid fuel or as a nozzle for mixing and atomizing at least one fuel with water or a chemical liquid additive, and dispersing the atomized mixture, a low-pollution combustion apparatus in which high efficiency combustion is conducted can be effectively constructed by using the device of the present invention.

(5) If the device of the present invention is arranged so that a liquid is finely atomized and dispersed into a gas, since sufficient contact can be attained between the liquid and gas, the device of the present invention can be utilized as means for spraying into the air the water of a fish farming pond, contacting water with oxygen and returing the oxygen-rich water to the pond, and also, as means for removing chlorine gas in city water by spraying it into the atmosphere.

The various applications listed above, are only examples, and there can be many other applications in the fields of fermentation apparatus, anti-pollution apparatus, chemical apparatus or other industrial apparatus.

What is claimed is:

1. In a device for atomizing at least one fluid, including a cylindrical fluid barrel having a tangential fluid inlet port, a converging zone at the upper end of said barrel, and a conical fluid outlet with a fluid dispersing round member, wherein the improvement comprises a flexible support structure for holding said fluid dispersing round member so that said fluid dispersing round member is hydrodynamically moved toward said conical fluid outlet by a low pressure created by a high speed turning motion of the fluid in said cylindrical barrel, whereby the fluid is dispersed in the form of a high speed dispersion filmy stream toward the environment surrounding the device.

2. The device according to claim 1, wherein said cylindrical fluid barrel is formed with at least two fluid inlet ports for enabling at least two different fluids under pressure to be ejected into said fluid barrel, respectively, said ejected fluids being mixed with one another in said fluid barrel while turning around an axis of a hollow cylinder formed by said fluid barrel.

3. The device according to claim 2, wherein said at least two inlet ports are arranged to be axially spaced apart from one another.

4. The device according to claim 1, wherein said support structure comprises a fixedly arranged support rod, a flexible support plate extending from said support rod toward a position above said fluid outlet of said fluid barrel, said flexible support plate holding said fluid dispersing round member, and a pair of nut elements threadedly engaged with said support rod, said pair of nut elements fixing therebetween said flexible support plate.

5. The device according to claim 1 wherein said support structure comprises: at least two fixedly arranged support rods extending toward a region above said fluid outlet, said support rods having screw threads, respectively, formed at one end portion thereof; threadedly moving elements engaged with said screw threads of said support rods, spring elements fixed at one end thereof to said threadedly moving elements, and; a support plate fixed to the other ends of said spring elements so as to be moved in a direction toward and away from said fluid outlet, said support plate holding said fluid dispersing round member.

6. The device according to claim 1, wherein said support structure comprises at least two fixedly arranged support rods extending toward a region above said fluid outlet, and a support plate movably mounted on said support rods, said support plate holding said fluid dispersing round member, and wherein said device further comprises means for adjustably establishing an initial opening between a dispersing surface of said fluid dispersing round member and a conical end face of said fluid barrel while said device is not operated.

7. The device according to claim 6 wherein said fluid dispersing round member is formed of a round plate attached to said support plate.

8. The device according to claim 1, wherein said support structure comprises a hollow cylindrical element in said fluid barrel, and elastic plate means movably holding said hollow cylindrical element, said hollow cylindrical element having an outermost end adjacent to said fluid outlet of said fluid barrel for holding said fluid dispersing round member.

9. The device according to claim 8, wherein said hollow cylindrical element is formed, at a periphery thereof adjacent to said outermost end, with a plurality of radial through-holes, and wherein said device further comprises a tubular fluid spouting member coaxially arranged in said hollow cylindrical element, said tubular fluid spouting member having a fluid spouting opening adjacent to said radial through-holes of said hollow cylindrical element and being supplied with a fluid to be spouted from said fluid spouting opening during operation of said device.

10. The device according to claim 1, further comprising means for limiting a fluid dispersing opening between a conical end face formed at an outermost end of said conical fluid outlet of said fluid barrel and a dispersing surface of said fluid dispersing round member within a predetermined range, thereby enabling said atomized fluid to be always dispersed at a high speed.

11. The device according to claim 10, wherein said limiting means comprise an elastic means exhibiting an elastic force applied to an opposite surface of said dispersing surface of said fluid dispersing round member, said elastic force acting to urge said fluid dispersing round member toward said conical fluid outlet of said cylindrical fluid barrel.

12. A device for atomizing at least one incoming fluid and dispersing the atomized fluid toward the environment surrounding the device in the form of a filmy dispersion stream comprising:

a fluid barrel comprised of an axial hollow cylinder having at least one fluid inlet port for enabling a fluid under pressure to be ejected into the fluid barrel in a tangential direction with respect to an axis of the hollow cylinder thereby causing the fluid to turn around the axis in said hollow cylinder, a fluid outlet formed at one end of said hollow cylinder for enabling the fluid to flow out of said fluid barrel, and an outwardly converging zone for accelerating the turning stream of the fluid prior to flowing from said fluid outlet, said fluid barrel being formed, at an outermost end of said fluid outlet, with a conical end face for enabling the fluid to disperse along said conical end face;

a fluid dispersing round member having a dispersing surface confronting and being shaped to be generally complementary with said conical end face of said fluid barrel, and;

a support structure for holding said fluid dispersing round member at a position adjacent to said fluid outlet of said barrel so that a fluid dispersing opening is defined between said conical end face of said fluid barrel and said dispersing surface of said fluid dispersing round member, said support structure comprising means for allowing said fluid dispersing round member to move toward or away from said fluid outlet of said barrel, said support structure including a fixedly arranged support rod, a flexible support plate extending from said support rod toward a position above said fluid outlet of said fluid barrel, said flexible support plate holding said fluid dispersing round member, and a pair of nut elements threadedly engaged with said support rod, said pair of nut elements fixing therebetween said flexible support plate.

13. A device for atomizing at least one incoming fluid and dispersing the atomized fluid toward the environment surrounding the device in the form of a filmy dispersion stream comprising:

a fluid barrel comprised of an axial hollow cylinder having at least one fluid inlet port for enabling a fluid under pressure to be ejected into the fluid barrel in a tangential direction with respect to an axis of the hollow cylinder thereby causing the fluid to turn around the axis in said hollow cylinder, a fluid outlet formed at one end of said hollow cylinder for enabling the fluid to flow out of said fluid barrel, and an outwardly converging zone for accelerating the turning stream of the fluid prior to flowing from said fluid outlet, said fluid barrel being formed, at an outermost end of said fluid outlet, with a conical end face for enabling the fluid to disperse along said conical end face;

a fluid dispersing round member having a dispersing surface confronting and being shaped to be generally complementary with said conical end face of said fluid barrel, and;

a support structure for holding said fluid dispersing round member at a position adjacent to said fluid outlet of said barrel so that a fluid dispersing opening is defined between said conical end face of said fluid barrel and said dispersing surface of said fluid dispersing round member, said support structure comprising means for allowing said fluid dispersing round member to move toward or away from said fluid outlet of said fluid barrel, said support structure including at least two fixedly arranged support rods axially extending toward a region above said fluid outlet, said support rods having screw threads, respectively, formed at one end portion thereof, threadedly moving elements engaged with said screw threads of said support rods, spring elements fixed at one end thereof to said threadedly moving elements, and a support plate fixed to the other ends of said spring elements so as to be moved in the axial direction of said fluid barrel above said fluid outlet, said support plate holding said fluid dispersing round member.

14. A device for atomizing at least one incoming fluid and dispersing the atomized fluid toward the environment surrounding the device in the form of a filmy dispersion stream comprising:
a fluid barrel comprised of an axial hollow cylinder having at least one fluid inlet port for enabling a fluid under pressure to be ejected into the fluid barrel in a tangential direction with respect to an axis of the hollow cylinder thereby causing the fluid to turn around the axis in said hollow cylinder, a fluid outlet formed at one end of said hollow cylinder for enabling the fluid to flow out of said fluid barrel, and an outwardly converging zone for accelerating the turning stream of the fluid prior to flowing from said fluid outlet, said fluid barrel being formed, at an outermost end of said fluid outlet, with a conical end face for enabling the fluid to disperse along said conical end face;
a fluid dispersing round member having a dispersing surface confronting and being shaped to be generally complementary with said conical end face of said fluid barrel,
a support structure for holding said fluid dispersing round member at a position adjacent to said fluid outlet of said barrel so that a fluid dispersing opening is defined between said conical end face of said fluid barrel and said dispersing surface of said fluid dispersing round member, said support structure comprising means for allowing said fluid dispersing round member to move toward or away from said fluid outlet of said fluid barrel, said support structure including at least two fixedly arranged support rods axially extending toward a region above said fluid outlet, and a support plate axially and movably mounted on said support rods, said support plate holding said fluid dispersing round member, and;
means for adjustably establishing an initial opening between said dispersing surface of said fluid dispersing round member and said conical end face of said fluid barrel while said device is not operated.

15. A device for atomizing at least one incoming fluid and dispersing the atomized fluid toward the environment surrounding the device in the form of a filmy dispersion stream comprising:
a fluid barrel comprised of an axial hollow cylinder having at least one fluid inlet port for enabling a fluid under pressure to be ejected into the fluid barrel in a tangential direction with respect to an axis of the hollow cylinder thereby causing the fluid to turn around the axis in said hollow cylinder, a fluid outlet formed at one end of said hollow cylinder for enabling the fluid to flow out of said fluid barrel, and an outwardly converging zone for accelerating the turning stream of the fluid prior to flowing from said fluid outlet, said fluid barrel being formed, at an outermost end of said fluid outlet, with a conical end face for enabling the fluid to disperse along said conical end face;
a fluid dispersing round member having a dispersing surface confronting and being shaped to be generally complementary with said conical end face of said fluid barrel; and
a support structure for holding said fluid dispersing round member at a position adjacent to said fluid outlet of said barrel so that a fluid dispersing opening is defined between said conical end face of said fluid barrel and said dispersing surface of said fluid dispersing round member, said support structure comprising means for allowing said fluid dispersing round member to move toward or away from said fluid outlet of said fluid barrel, said support structure including a hollow cylindrical element coaxially mounted in said fluid barrel, and elastic plate means axially and movably holding said hollow cylindrical element, said hollow cylindrical element having an outermost end adjacent to said fluid outlet of said fluid barrel for holding said fluid dispersing round member.

16. A device for atomizing at least one incoming fluid and dispersing the atomized fluid toward the environment surrounding the device in the form of a filmy dispersion stream comprising:
a fluid barrel comprised of an axial hollow cylinder having at least one fluid inlet port for enabling a fluid under pressure to be ejected into the fluid barrel in a tangential direction with respect to an axis of the hollow cylinder thereby causing the fluid to turn around the axis in said hollow cylinder, a fluid outlet formed at one end of said hollow cylinder for enabling the fluid to flow out of said fluid barrel, and an outwardly converging zone for accelerating the turning stream of the fluid prior to flowing from said fluid outlet, said fluid barrel being formed, at an outermost end of said fluid outlet, with a conical end face for enabling the fluid to disperse along said conical end face;
a fluid dispersing round member having a dispersing surface confronting and being shaped to be generally complementary with said conical end face of said fluid barrel;
a support structure for holding said fluid dispersing round member at a position adjacent to said fluid outlet of said barrel so that a fluid dispersing opening is defined between said conical end face of said fluid barrel and said dispersing surface of said fluid dispersing round member, said support structure comprising means for allowing said fluid dispersing round member to move toward or away from said fluid outlet of said fluid barrel, said support structure including a hollow cylindrical element coaxially mounted in said fluid barrel, and elastic plate means axially and movably holding said hollow cylindrical element, said hollow cylindrical element having an outermost end adjacent to said fluid outlet of said fluid barrel for holding said fluid dispersing round member, said hollow cylindrical element being formed with a plurality of radial throughholes at a periphery thereof adjacent to said outermost end, and;

a tubular fluid spouting member coaxially arranged in said hollow cylindrical element, said tubular fluid spouting member having a fluid spouting opening adjacent to said radial through-holes of said hollow cylindrical element and being supplied with a fluid to be spouted from said fluid spouting opening during operation of said device.

* * * * *

UNITED STATES PATENT AND TRADEMARK OFFICE
CERTIFICATE OF CORRECTION

PATENT NO. : 4,165,038
DATED : August 21, 1979
INVENTOR(S) : Toshiharu Kumazawa

It is certified that error appears in the above—identified patent and that said Letters Patent is hereby corrected as shown below:

Column 6, line 27, "$R_{H3}$" should read -- $F_{H3}$ --.

Column 9, line 63, "percent" should be deleted.

Signed and Sealed this

Eighth Day of January 1980

[SEAL]

Attest:

SIDNEY A. DIAMOND

Attesting Officer     Commissioner of Patents and Trademarks